United States Patent
Blank

[15] 3,672,701
[45] June 27, 1972

[54] TRAILING WHEEL STRUCTURE FOR VEHICLE-DRAWN IMPLEMENT

[72] Inventor: Wilbur L. Blank, 524 E. Jefferson St., Toulon, Ill. 61483

[22] Filed: Aug. 20, 1970

[21] Appl. No.: 65,376

[52] U.S. Cl................280/414.5, 172/327, 280/43.23
[51] Int. Cl................................................B60g 1/00
[58] Field of Search............280/414.5, 43.17, 43.23; 172/326, 327

[56] References Cited

UNITED STATES PATENTS

| | | | |
|---|---|---|---|
| 3,517,747 | 6/1970 | Fischer | 280/414.5 |
| 1,870,906 | 8/1932 | Gottschalk | 214/DIG. 10 |
| 3,542,135 | 11/1970 | McCanse | 280/414.5 |

FOREIGN PATENTS OR APPLICATIONS

| 190,955 | 1/1962 | Sweden | 280/414.5 |
|---|---|---|---|

Primary Examiner—Benjamin Hersh
Assistant Examiner—Robert R. Song
Attorney—McNenny, Farrington, Pearne & Gordon

[57] ABSTRACT

A tractor having a hydraulic pump is hitched to a disc harrow to be pulled over a field along a center line of travel. A ground wheel carriage is connected to the disc harrow at the center of travel. The connection between the disc harrow and the ground wheel carriage includes upper and lower links and a double acting hydraulic cylinder to raise and lower the disc harrow with respect to the ground.

5 Claims, 3 Drawing Figures

PATENTED JUN 27 1972 3,672,701

INVENTOR.
WILBUR L. BLANK
BY
McNENNY, FARRINGTON, PEARNE & GORDON

ATTORNEYS

“3,672,701”

TRAILING WHEEL STRUCTURE FOR VEHICLE-DRAWN IMPLEMENT

BACKGROUND OF THE INVENTION

This invention relates generally to vehicle-drawn earth working implements, and more particularly to disc harrows having a means for selectively controlling the height of the harrow above a ground reference plane.

Vehicle-drawn earth working implements, such as disc harrows, generally include an implement frame structure and an attachment means or hitch for securing the implement frame structure to a motor vehicle such as a tractor. Such attachment means for earth working implements generally also must be operable to raise and lower the earth working implement relative to a ground reference plane to control the amount of penetration of the ground by the implement, and to hold the implement in a raised position when the tractor is driven on hard surface roadways.

Although such prior art earth working implements have received wide acceptance, they are nevertheless subject to certain disadvantages. Because the entire weight of such implements must be supported by the hitch in the absence of auxiliary wheels and further because the center of gravity of such implements may be relatively great in distance from the hitch, the hitch is subject to excessively heavy loading. Furthermore, because of the distance between the hitch and the center of gravity of the implement, the implement may cause vertical bouncing of the tractor and the implement when the tractor is driven at higher speeds on hard surface roadways, causing the raised implement to intermittently engage and thus damage the roadway. Still further, the height of the forward and rearward portions of such prior art earth working implements relative to a ground reference level cannot be independently changed as the implement is being pulled through a field.

SUMMARY OF THE INVENTION

The present invention overcomes these and other problems of prior art earth working implements by providing an earth working implement which includes a trailing wheel structure for controlling the height of a rear portion of the earth working implement with respect to a ground reference plane. In this manner, a portion of the load is removed from the hitch connection at the tractor, and bouncing of the implement at higher speeds on hard surface roadways is prevented. Still further, the trailing wheel structure of the invention provides a means for selectively controlling the height of the rear portion of the earth working implement with respect to a ground reference plane, so that the height of the rear portion of the implement can be controlled substantially independently of the height of the front portion of the implement to provide greater versatility for the implement. Still further, the invention provides a trailing wheel structure having a substantially vertical pivotal axis which is disposed forward of the rotational axis of the wheel to provide caster, and a link means for maintaining the pivotal axis substantially vertical throughout the range of movement of the trailing wheel structure.

In a preferred embodiment, the invention provides a vehicle-drawn earth working implement which includes an implement frame structure and a trailing wheel structure. The trailing wheel structure includes a wheel carriage having at least one wheel rotatably journaled thereon about a rotational axis, and the wheel carriage is pivotally mounted on a support member about a pivotal axis. The pivotal axis is substantially vertical and is arranged in front of the wheel rotational axis to provide the trailing wheel with a caster movement. A power means is provided for moving the implement frame structure between a raised position and a lowered position relative to the wheel carriage to vary the distance between the implement frame structure and a ground reference plane. A link means interconnects the implement frame structure with the support member and maintains the pivotal axis substantially perpendicular to the ground reference plane throughout the range of movement of the wheel carriage. In this manner, the invention provides a caster type trailing wheel structure in which the caster is retained throughout the range of movement of the wheel.

In the preferred embodiment, the link means includes a first link and a second link. Each of the links is pivotally connected to the implement frame structure and to the support member at spaced apart link axes. The distance between the link axes of the first link is equal to the distance between the link axes of the second link to provide a parallelogram linkage. The power means includes an expansible chamber fluid motor pivotally connected to the implement frame structure and to the support member at spaced apart fluid motor axes. The mechanical advantage of the fluid motor may be changed by changing the distance between the axes of the fluid motor and the axes of the first and second links so that any desired travel of the wheel carriage may be obtained by a fluid motor having a given stroke.

BRIEF DESCRIPTION OF THE DRAWINGS

These and other aspects and advantages of the invention will become more readily apparent upon an understanding of the preferred embodiment shown in the drawings, wherein.

DESCRIPTION OF THE PREFERRED EMBODIMENT

Figure 1:
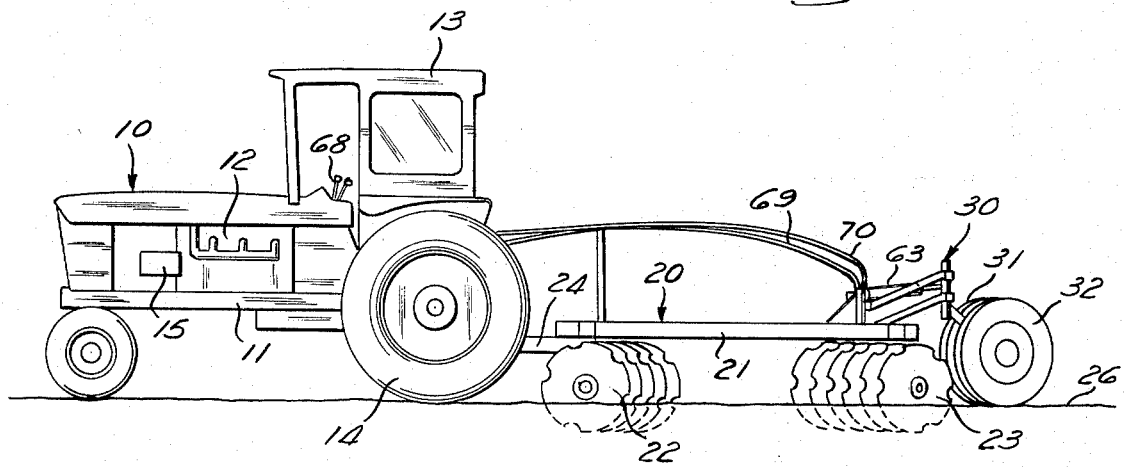
FIG. 1 is a schematic side elevational view of a tractor and earth working implement embodying the principles of the invention.
Figure 3:
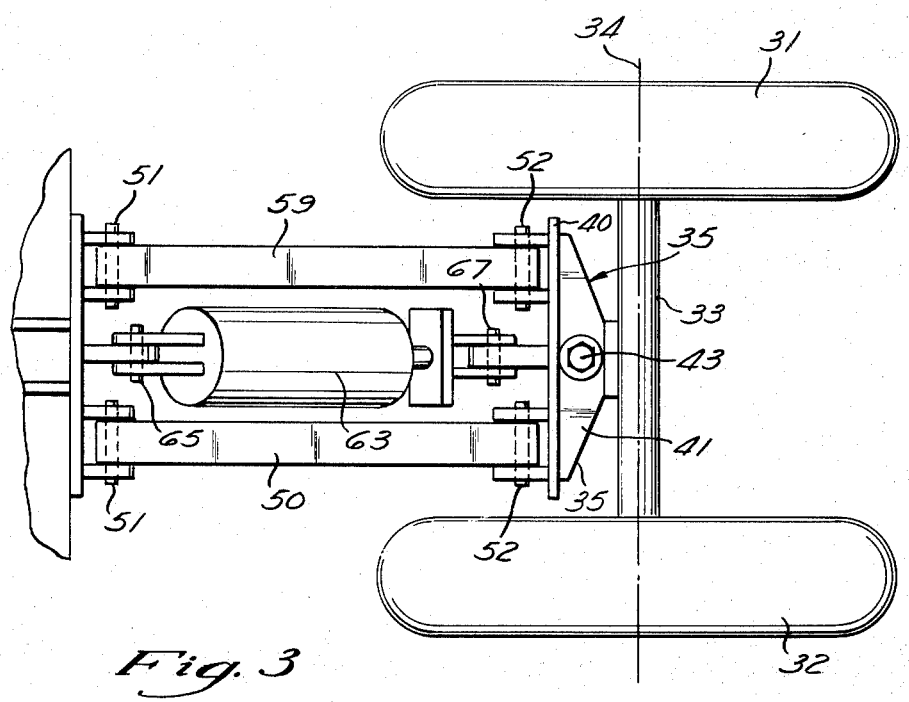
FIG. 3 is an enlarged schematic top plan view of the trailing wheel structure shown in FIG. 1.

Referring now to the drawings in greater detail, FIG. 1 shows a tractor 10 which includes a tractor frame 11, an internal combustion engine power source 12, and an operator's cab 13. The engine 12 provides driving torque for the drive wheels 14 and provides driving torque for a hydraulic pump 15, which provides a source of fluid pressure.

A vehicle-drawn earth working implement 20, which is a disc harrow in the preferred embodiment, includes an implement frame structure 21, a set of forward discs 22, and a set of rearward discs 23. A two point hitch 24 is provided to connect the disc harrow 20 to the tractor 10. The hitch 24 is powered by a fluid motor (not shown) which is operated by fluid pressure from the pump 15 for movement in a vertical direction toward and away from a ground reference plane 26 to raise and lower the front portion of the disc harrow 20 including the forward discs 22 relative to the ground reference level 26. In this manner, the hitch 24 controls the penetration of the forward discs 22 and also provides a means for raising the forward discs 22 above the ground reference level 26 when the disc harrow 20 is pulled over hard surface roadways.

To provide a means for raising the rearward discs 23 relative to the ground reference level 26 substantially independent of the height of the forward discs 22, the invention provides a trailing wheel structure 30, which extends rearwardly from the implement frame structure 21 at the center line of travel of the disc harrow 20. The trailing wheel structure 30 includes two wheels 31 and 32 rotatably journaled on a conventional wheel carriage 33 about a rotational axis 34. The wheel carriage 33 is pivotally mounted on a support member 35 by a pivot pin 36. The pivot pin 36 is received within a cylindrical portion 37 of support member 35 and is retained therein by a flat washer member 38 which is held in place by a suitable nut 39 threadably secured to the end of the pivot pin 36 in a well-known manner. The support member 35 further includes support plates 40, 41 and 42, which are suitably welded to the cylindrical portion 37 to provide adequate structural rigidity for the support member 35. In the preferred embodiment, the rotational axis 34 of the wheels 31 and 32 is disposed rearwardly of a substantially vertical pivotal axis 43 of the pivot pin 36. In this manner, the wheels 31 and 32 will track behind the disc harrow 20 so that the trailing wheel structure 30 will not reduce the maneuverability of the tractor-disc harrow combination.

The invention further provides a link means interconnecting the implement frame structure 21 and the support member 35. The link means includes a first link 50 pivotally connected to the implement frame structure about a link axis 51 and pivotally connected to the support member 35 about a link axis 52, and a second link member 53 pivotally connected to the implement frame structure about axis 54 and pivotally connected to the support member 35 about axis 55. In the preferred embodiment, the distance between the link axes 51 and 52 of the first link 50 is substantially equal to the distance between the link axes 54 and 55 of the second link 53, and the link axes 54 and 55 of the second link 53 are closer to the ground reference level 26 than the link axes 51 and 52 of the first link 50, respectively. In this manner, a parallelogram linkage is provided which maintains the pivotal axis 43 substantially perpendicular to the ground reference plane 26 throughout the range of movement of the implement frame structure 21 relative to the support member 35 and wheel carriage 33. In this manner, the caster provided by the nonintersecting axes 43 and 34 is maintained substantially constant throughout the range of movement of the frame structure 21. A second pair of links identical to the above-described first and second links includes an upper link 59 and a lower link 60. The link 59 is pivotally secured to the implement frame structure 21 and the support member 35 at link axes which are coaxial with axes 51 and 52 respectively. In a similar manner, the link 60 is pivotally secured to the implement frame structure 21 and to the support member 35 at link axes which are coaxial with the axes 54 and 55 respectively.

Figure 2:
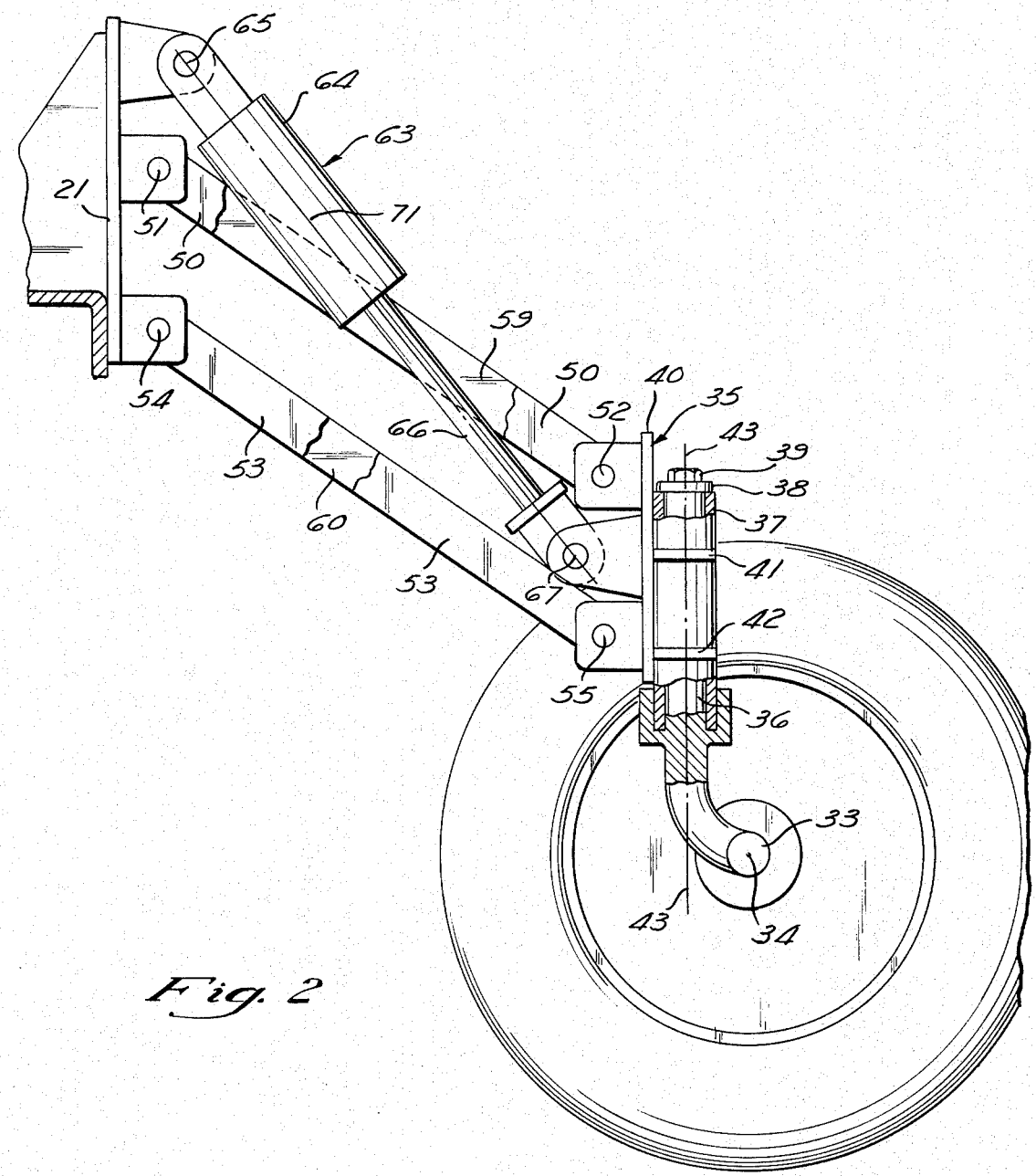
FIG. 2 is an enlarged schematic side elevational view with portions cut away for clarity of the trailing wheel structure of the earth working implement shown in FIG. 1, but with the trailing wheel structure shown in its lowered position.

A power means which includes an expansible chamber fluid motor 63 is also provided to raise and lower the implement frame structure 21 relative to the support member 35 and wheel carriage 33. The fluid motor 63 includes a cylinder member 64 which is pivotally connected to the implement frame structure 21 at a pivotal axis 65 and a rod 66 which is pivotally connected to the support member 35 at pivotal axis 67. The fluid motor 63 is of the double acting type, and control valve 68 selectively connects one side of the fluid motor 63 to fluid pressure from the pump 15 and the other side to the fluid reservoir (not shown) by flexible conduits 69 and 70. The pivotal axes 65 and 67 are arranged such that the longitudinal axis 71 of the fluid motor 63 is in nonparallel or intersecting relation to a line drawn between axes 51 and 52 and to a line drawn between axes 54 and 55. In this manner, by varying the distance between the axes 65 and 67, the fluid motor 63 raises and lowers the rear portion of the implement frame structure 21 relative to the support member 35 and the wheel carriage 33. As shown in the preferred embodiment, when the fluid motor push rod 66 is retracted as shown in FIG. 1, the rearward discs 23 are in a lowered position relative to the ground reference level 26. When the fluid motor push rod 66 is extended as shown in FIG. 2, the implement frame structure 21 is raised relative to the ground reference level 26. By changing the amount of offset of the axes 65 and 67, that is, by changing the angle between the axis 71 and a line drawn between the axes 51 and 52, the mechanical advantage of the fluid motor 63 is changed. With the particular configuration shown in the preferred embodiment, a cylinder having a relatively small stroke operates to lift and lower the support member 35 and wheel carriage 33 through a distance greater than the length of its stroke.

Although a preferred embodiment of the invention has been shown and described in detail, various modifications and rearrangements may be made without departing from the scope of the invention as defined by the claims.

I claim:

1. A vehicle-drawn implement comprising an implement frame structure and a trailing wheel structure including a wheel carriage, at least one wheel rotatably journaled on said wheel carriage on a rotational axis, said wheel carriage being pivotally mounted on a support member about a pivotal axis, link means interconnecting said implement frame structure and said support member for maintaining said pivotal axis substantially perpendicular to a ground reference plane throughout the range of movement of said wheel carriage, said link means including a first link and a second link, each of said links being pivotally connected to said implement frame structure and to said support member at spaced apart first and second link axes, respectively the distance between the first and second link axes of said first link being equal to the distance between said first and second link axes of said second link, and said first and second link axes of said second link being closer to the said ground reference plane than said first and second link axes of said first link, respectively, and power means for moving said wheel carriage between a raised position and a lowered position relative to said implement frame structure to vary the distance between said implement frame structure and said ground reference plane, said power means including an expansible chamber fluid motor pivotally connected to said implement frame structure and to said support member at spaced apart fluid motor axes, one pivot point of said fluid motor being located between the spaced apart link axes at one end of said links, and the other pivot point of said fluid motor being located outside the spaced apart link axes at the other end of said links.

2. A vehicle-drawn implement as set forth in claim 1 wherein said carriage pivotal axis is arranged forwardly of and in nonintersecting relation to said wheel rotational axis.

3. A vehicle-drawn implement as set forth in claim 1 including a second link means identical to said first-mentioned link means, said first-mentioned link means being on one side of said fluid motor and said second link means being on the other side of said fluid motor.

4. In combination, a motor vehicle, an implement for being pulled by said motor vehicle along a center line of travel, a lift hitch for attaching a front portion of said implement to said motor vehicle for selectively raising and lowering said front portion relative to a ground reference plane, and a trailing wheel structure means disposed on a rear portion of said implement at said center line of travel for selectively raising and lowering said rear portion relative to said ground reference plane substantially independently of the height of said front portion relative to said ground reference plane, said trailing wheel structure including a wheel carriage, at least one wheel rotatably journaled on said wheel carriage on a rotational axis, said wheel carriage being pivotally mounted on a support member about a pivotal axis, link means interconnecting said implement frame structure and said support member for maintaining said pivotal axis substantially perpendicular to a ground reference plane throughout the range of movement of said wheel carriage, said link means including a first link and a second link, each of said links being pivotally connected to said implement frame structure and to said support member at spaced apart first and second link axes, respectively, the distance between the first and second link axes of said first link being equal to the distance between said link axes of said second link, and said first and second link axes of said second link being closer to the said ground reference plane than said first and second link axes of said first link, respectively, and power means for moving said wheel carriage between a raised position and a lowered position relative to said implement frame structure to vary the distance between said implement frame structure and said ground reference plane, said power means including an expansible chamber fluid motor pivotally connected to said implement frame structure and to said support member at spaced apart fluid motor axes, one pivot point of said fluid motor being located between the spaced apart link axes at one end of said links, and the other pivot point of said fluid motor being located outside the spaced apart link axes at the other end of said links.

5. The combination as set forth in claim 4, including a second link means identical to said first-mentioned link means, said first-mentioned link means being on one side of said fluid motor and said second link means being on the other side of said fluid motor.

* * * * *